R. G. STEELE.
GOLD SAVING APPARATUS.
APPLICATION FILED APR. 22, 1908.
899,271.
Patented Sept. 22, 1908.
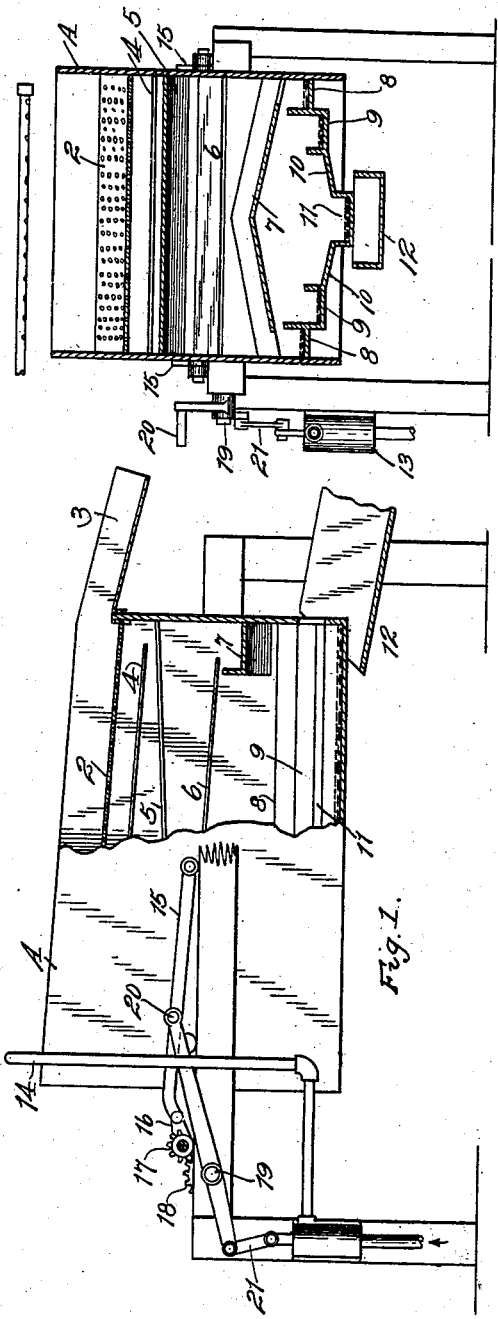
Witnesses:
F. E. Maynard.
E. Penfield.
Inventor:
Richard G. Steele;
By Geo. H. Strong,
Atty

UNITED STATES PATENT OFFICE.

RICHARD GEORGE STEELE, OF RUTHERFORD, CALIFORNIA, ASSIGNOR OF ONE-HALF TO THOMAS B. EDINGTON, OF RUTHERFORD, CALIFORNIA.

GOLD-SAVING APPARATUS.

No. 899,271.  Specification of Letters Patent.  Patented Sept. 22, 1908.

Application filed April 22, 1908. Serial No. 428,654.

*To all whom it may concern:*

Be it known that I, RICHARD G. STEELE, citizen of the United States, residing at Rutherford, in the county of Napa and State of California, have invented new and useful Improvements in Gold-Saving Apparatus, of which the following is a specification.

My invention relates to an apparatus which is especially designed for working black sands, placer gravels, or other equivalent material containing gold, platinum, and other minerals.

It consists of a suitably supported box containing screens and copper-plates, so disposed with relation to each other that the material fed upon the screens will be separated, the coarser being discharged at the lower end, and the finer falling through upon the plates over which it passes from one to another, and is finally delivered at the apex of transversely inclined chutes, from which it is then delivered into wells or receivers containing mercury; these overflowing from one to another and finally to a central well containing sodium amalgam which will arrest any particles of platinum which may be contained in the passing material.

It also comprises details of construction which will be more fully explained by reference to the accompanying drawings, in which—

Figure 1 is a side elevation and section. Fig. 2 is a transverse section.

As shown in the drawing, A is a containing box or receptacle of any suitable size. This is supported upon rollers or suspended, so that it may be oscillated in the direction of its length by mechanism to be hereafter described. In the upper part of the box is an inclined screen 2, the meshes of which are such that the coarser valueless material will pass over the screen and be discharged at the lower end by a chute 3. Material may be delivered upon the screen from any suitable or desired source, depending upon the character of the material to be operated upon. Beneath the screen is an amalgamated copper-plate 4 which is inclined substantially parallel with the inclination of the screen. This plate receives the fine material which has passed through the screen, and a portion of such gold or other substance as can be amalgamated will, in passing over the plate, be caught upon the surface. From the lower end of this plate, the material falls upon another plate 5. The end of this plate which receives the material is highest, being very close to the discharge end of the first plate; and the material again flowing over this amalgamated plate will allow more of the gold to be caught by the amalgam of the plate. A third amalgamated copper plate 6, inclined in the opposite direction, is shown operating in the same manner as the plate 5. It will be understood that any number of these plates may be employed so that whatever gold or material which can amalgamate, will be pretty thoroughly separated from the sand or valueless material.

The last of the inclined copper plates discharges into a trough or chute 7. This chute may be inclined in either direction. In the drawings I have shown it as having the highest point at the center, and declining outwardly in each direction, and transversely to the position of the plates previously described. The surface of this trough or chute may, if desired, be also amalgamated, and upon each side of the apparatus, these inclined chutes discharge into receptacles 8 containing mercury. 9 are other receptacles disposed nearer the center and sufficiently below the receptacles 8 so that the overflow from the outer receptacles will pass into the receptacles 9; thence it may pass through still others, or over inclined chutes 10 which finally discharge the material into a central receiver 11, and this contains sodium amalgam.

It is well known that platinum is ordinarily found in fine thin scales which are often so coated that they will not amalgamate in any ordinary manner, but by bringing them into contact with sodium amalgam, they will be amalgamated and saved. The remaining worthless material may overflow from the receiver 11, and pass out through any suitable discharge chute as at 12. In order to supply water for this purpose, I have shown a pump as at 13; a pipe 14 leading from the pump up to a point above the screen where it connects with a transverse spray pipe, and water is thus discharged and mingled with the passing material so as to make it flow freely.

The suspended apparatus is reciprocated in the direction of its length by means of a connecting rod or links 15 one end of which may be attached to the box, and the other is connected with a short crank arm as at 16. The shaft of this crank arm carries a pinion 17, which engages with a gear 18 upon the crank shaft 19.

The crank 20 which may be operated by hand, or power, serves to oscillate the shafts, and its opposite end extends so as to connect with the pump pitman 21.

The arm 20 is practically a lever since it is not necessary to revolve it, but only to oscillate it to give the pump piston its desired throw, and this oscillating motion transmitted through the gear and pinion, will produce a sufficient oscillation of the crank 16 to reciprocate the amalgamating apparatus.

It will be understood that any equivalent or suitable device may be employed to produce these movements without altering the character of my invention.

Having thus described my invention, what I claim and desire to secure by Letters Patent is—

1. An apparatus for saving gold and mineral products, said apparatus consisting of a horizontally supported oscillating box having an inclined screen in the upper part, amalgamated copper plates, the uppermost of which is located beneath the screen to receive material therefrom, said plates being carried by the box and inclining alternately in opposite directions, an inclined receiving chute into which the lowermost of the plates discharges, a series of mercury-containing receptacles, said receptacles being carried by the box and being arranged parallel with the sides thereof and underlying and extending in the direction of the length of said plates, into the first of which receptacles the discharged material is received, and into the others of which it passes by overflow, a final sodium amalgam container, and an ultimate discharge chute for the waste material.

2. In an apparatus of the character described, a horizontally supported box, means by which said box is oscillated in the direction of its length, an inclined screen located in the upper part of the box, and upon which material to be treated is discharged with water, oppositely inclined amalgamated copper plates carried by said box and upon which the material is successively discharged from the screen and from each other, a double chute upon which the last of the amalgam plates discharges, said chute declining transversely and outwardly with relation to the plates, mercury-containing chambers carried by the box and arranged side by side therein in different horizontal planes, said chambers having their greatest length in the direction of the length of the plates and parallel with the long sides of the box, into which chambers the outer ends of the chute discharge, a centrally located container of sodium amalgam, said container serving as the final receiver for saving platinum, and a waste overflow leading therefrom.

3. In an apparatus of the character described, a horizontally supported box carrying inclined screen amalgamated copper plates, diverting chute and mercury-containing receiving chambers, said chute and chambers being carried by the box and said chambers extending parallel with the long sides of said box and arranged side by side in different horizontal planes and adapted to deliver material from one to the other towards the center of the box, means for supplying water to the box, said means including a pump and oscillating lever through which power is applied to operate the pump, gears and pinions actuated in unison with the movements of the pump, and connecting rods or pitmen extending therefrom to the box whereby it is reciprocated in the direction of its length.

In testimony whereof I have hereunto set my hand in presence of two subscribing witnesses.

RICHARD GEORGE STEELE.

Witnesses:
CHARLES A. ENFIELD,
CHARLES EDELMAN.